United States Patent
Ghosh et al.

(10) Patent No.: US 8,698,354 B2
(45) Date of Patent: Apr. 15, 2014

(54) SYSTEM AND METHOD FOR BIDIRECTIONAL DC-AC POWER CONVERSION

(75) Inventors: Rajesh Ghosh, Bangalore (IN); Raju Narasimha, Bangalore (IN); Mahesh Lipare, Bangalore (IN); Damir Klikic, Waltham, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 594 days.

(21) Appl. No.: 12/940,100

(22) Filed: Nov. 5, 2010

(65) Prior Publication Data

US 2012/0112547 A1    May 10, 2012

(51) Int. Cl.
*H02J 7/00* (2006.01)
*H02J 9/00* (2006.01)

(52) U.S. Cl.
USPC .......................................................... 307/66

(58) Field of Classification Search
USPC .............................................. 307/64, 66, 82
See application file for complete search history.

(56) References Cited

U.S. PATENT DOCUMENTS

| | | |
|---|---|---|
| 4,831,508 A | 5/1989 | Hunter |
| 4,980,812 A | 12/1990 | Johnson, Jr. et al. |
| 5,017,800 A | 5/1991 | Divan |
| 5,099,410 A | 3/1992 | Divan |
| 5,126,585 A | 6/1992 | Boys |
| 5,184,025 A | 2/1993 | McCurry et al. |
| 5,264,732 A | 11/1993 | Fiorina et al. |
| 5,291,383 A | 3/1994 | Oughton |
| 5,315,533 A | 5/1994 | Stich et al. |
| 5,384,792 A | 1/1995 | Hirachi |
| 5,465,011 A | 11/1995 | Miller et al. |
| 5,579,197 A | 11/1996 | Mengelt et al. |
| 5,677,831 A | 10/1997 | Lin |
| 5,982,652 A | 11/1999 | Simonelli et al. |
| 6,069,412 A | 5/2000 | Raddi et al. |
| 6,184,593 B1 | 2/2001 | Jungreis |
| 6,201,319 B1 | 3/2001 | Simonelli et al. |
| 6,201,371 B1 | 3/2001 | Kawabe et al. |
| 6,330,176 B1 | 12/2001 | Thrap et al. |

(Continued)

FOREIGN PATENT DOCUMENTS

EP    1 962 415 A2    8/2008

OTHER PUBLICATIONS

International Search Report and Written Opinion of the International Searching Authority from corresponding PCT/US2011/054529 mailed Oct. 30, 2012.

*Primary Examiner* — Carlos Amaya
(74) *Attorney, Agent, or Firm* — Lando & Anastasi, LLP

(57) ABSTRACT

A power converter includes a power input configured to receive input power from an AC power source, a power output configured to provide output power to a load, a battery interface configured to exchange DC power with a battery, and power converter circuitry. The power converter circuitry is adapted to, in a first interconnection configuration, convert the input power into the DC power at the battery interface, and, in a second interconnection configuration, convert the DC power at the battery interface into the output power. The power converter circuitry has a power line, a transformer, a first connection node switchably connected to the power line in the first interconnection configuration and switchably connected to the transformer in the second interconnection configuration, and a second connection node switchably connected to the transformer in the first interconnection configuration and switchably connected to the power line in the second interconnection configuration.

20 Claims, 13 Drawing Sheets

(56) References Cited

U.S. PATENT DOCUMENTS

| | | |
|---|---|---|
| 6,356,470 B1 | 3/2002 | Sadler et al. |
| 6,400,586 B2 | 6/2002 | Raddi et al. |
| 6,400,591 B2 | 6/2002 | Reilly et al. |
| 6,630,751 B2 | 10/2003 | Curtis et al. |
| 6,661,678 B2 | 12/2003 | Raddi et al. |
| 6,795,322 B2 | 9/2004 | Aihara et al. |
| 6,838,925 B1 | 1/2005 | Nielsen |
| 6,906,933 B2 | 6/2005 | Taimela |
| 7,012,825 B2 | 3/2006 | Nielsen |
| 7,050,312 B2 | 5/2006 | Tracy et al. |
| 7,142,950 B2 | 11/2006 | Rasmussen et al. |
| 7,456,524 B2 | 11/2008 | Nielsen et al. |
| 2002/0118556 A1 | 8/2002 | Johnson |
| 2002/0126518 A1 | 9/2002 | Lazarovich |
| 2002/0130648 A1 | 9/2002 | Raddi et al. |
| 2004/0036361 A1 | 2/2004 | Dai et al. |
| 2004/0084967 A1 | 5/2004 | Nielsen |
| 2005/0024016 A1 | 2/2005 | Breen et al. |
| 2005/0036248 A1 | 2/2005 | Klikic et al. |
| 2005/0162019 A1 | 7/2005 | Masciarelli et al. |
| 2005/0168073 A1 | 8/2005 | Hjort |
| 2005/0201127 A1 | 9/2005 | Tracy et al. |
| 2006/0043792 A1 | 3/2006 | Hjort et al. |
| 2006/0043793 A1 | 3/2006 | Hjort et al. |
| 2006/0043797 A1 | 3/2006 | Hjort et al. |
| 2006/0044846 A1 | 3/2006 | Hjort et al. |
| 2006/0238941 A1 | 10/2006 | Ingemi et al. |
| 2006/0256586 A1 | 11/2006 | Ohshima et al. |
| 2007/0064363 A1 | 3/2007 | Nielsen et al. |
| 2007/0086216 A1 | 4/2007 | Iida |
| 2007/0228837 A1 | 10/2007 | Nielsen et al. |
| 2008/0042491 A1 | 2/2008 | Klikic et al. |
| 2008/0061628 A1 | 3/2008 | Nielsen et al. |
| 2008/0067872 A1 | 3/2008 | Moth |
| 2008/0252145 A1 | 10/2008 | Urakabe et al. |
| 2009/0160254 A1 | 6/2009 | Wu et al. |
| 2009/0289504 A1* | 11/2009 | Ho et al. .................... 307/66 |

* cited by examiner

SYSTEM AND METHOD FOR BIDIRECTIONAL DC-AC POWER CONVERSION

BACKGROUND OF THE INVENTION

1. Field of the Invention

Embodiments of the present invention relate generally to DC-AC power conversion, and more particularly, to bidirectional DC-AC power conversion in uninterruptible power supplies.

2. Discussion of Related Art

Uninterruptible power supplies (UPS) are used to provide continuous power to devices, or loads, when the primary power source, or mains, fails. Typical loads include computer systems with critical power requirements, but other loads, such as heating/cooling/ventilation systems, lighting systems, and televisions may also be supported by a UPS. A UPS designed for home use may provide backup power for anywhere from about five minutes to several hours. A UPS unit typically contains one or more low-voltage batteries (e.g., 12 V, 24 V, or 48 V), depending on the size of the unit, as a power source when AC mains is unavailable. DC power provided by the battery is converted to AC power by an inverter, which in turn is provided to the load. A battery charger, which converts AC power to DC power, may be included in the UPS to charge the battery when AC mains is available to ensure that backup power will be available when needed. The UPS may also include a control unit for automatically managing the operation of the UPS and the power conversion functions.

Various techniques have been developed for DC-AC power conversion in a UPS. In one technique, a low-frequency (e.g., 50/60 Hz) transformer is used to step up the battery voltage to an output voltage, and also to provide isolation between the battery and the load. Low-frequency transformers are bulky, heavy, and have poor power conversion efficiency. In another technique, a high-frequency transformer is used in place of the low-frequency transformer. Switching devices in the power conversion circuit create, for example, either a sine wave or square wave output voltage. There may be two separate power conversion channels, one for the inverter and another for the charger, or a single, bi-directional power conversion channel. Such devices require many high-voltage switches, a large transformer, high-current-rated low-voltage switches to support the load reactive power and large current, and/or additional components which increase manufacturing costs and also suffer from low power conversion efficiency and low utilization rates. Also, the control complexity is high.

BRIEF SUMMARY OF THE INVENTION

According to one embodiment of the present invention, a power converter includes a power input configured to receive input power from an AC power source, a power output configured to provide output power to a load, a battery interface configured to exchange DC power with a battery, and power converter circuitry coupled to the power input, the power output, and the battery interface. The power converter circuitry is adapted to, in a first interconnection configuration, convert the input power into the DC power at the battery interface. The power converter circuitry is further adapted to, in a second interconnection configuration, convert the DC power at the battery interface into the output power. The power converter circuitry has a power line coupled to at least one of the power input and the power output, a transformer, a first connection node switchably connected to the power line in the first interconnection configuration and switchably connected to the transformer in the second interconnection configuration, and a second connection node switchably connected to the transformer in the first interconnection configuration and switchably connected to the power line in the second interconnection configuration.

In another embodiment, the power converter circuitry may include a relay coupled to the first connection node, the second connection node, the power line and the transformer for interconnecting the first connection node, the second connection node, the power line and the transformer into the first interconnection configuration or the second interconnection configuration.

In yet another embodiment, the power converter may further include a controller coupled to the power converter circuitry. The controller may be configured to select the first interconnection configuration or the second interconnection configuration based upon the input power received at the power input.

In one embodiment, the first interconnection configuration of the power converter circuitry may include a boost converter, an inverter, or both. The inverter may include a plurality of switching devices configured in a full-bridge configuration or a half-bridge configuration.

In one embodiment, the power converter circuit may include a DC-to-DC converter configured as a full-bridge converter or a push-pull converter. The DC-to-DC converter may include a series resonant power converter. The DC-to-DC converter may include a high-frequency transformer.

In another embodiment, the power converter may include the battery, which may be coupled to the battery interface.

In one embodiment, the power converter may be included in an uninterruptible power supply.

According to one embodiment, the transformer may have a first tap and a second tap, wherein the first connection node is switchably connected to the first tap of the transformer in the second interconnection configuration, and wherein the second connection node is switchably connected to the second tap of the transformer in the first interconnection configuration.

According to another embodiment of the present invention, a method of converting power in an uninterruptible power supply includes connecting, in a first mode of operation, a first connection node of a power conversion circuit to an AC power source; connecting, in the first mode of operation, a second connection node of the power conversion circuit to a transformer; receiving, in the first mode of operation, input power from the AC power source; converting the input power into DC power during the first mode of operation; connecting, in a second mode of operation, the first connection node to the transformer; connecting, in the second mode of operation, the second connection node to a load; receiving, in the second mode of operation, the DC power from a DC power source; and converting the DC power into output power during the second mode of operation.

The power conversion circuit may include a plurality of switching devices. The method may further include operating, in the first mode of operation, the plurality of switching devices with a square wave pulse width modulated signal to convert the input power into a high-voltage DC power.

In one embodiment, the plurality of switching devices is a first plurality of switching devices, and the power conversion circuit further includes a second plurality of switching devices. The method may further include operating, in the first mode of operation, the second plurality of switching devices in synchronization with the first plurality of switching devices to convert the high-voltage DC power into the DC power.

In another embodiment, the uninterruptible power supply may include a boost converter. The method may further include regulating, in the first mode of operation, a battery charging current of the uninterruptible power supply by operating the first plurality of switching devices and the second plurality of switching devices with a pulse width modulated signal having a duty cycle of 50%, and adjusting, in the first mode of operation, a switching frequency of the boost converter.

In another embodiment, the uninterruptible power supply includes a series resonant DC to DC converter. The method may further comprise regulating, in the first mode of operation, a battery charging current of the uninterruptible power supply by operating the first plurality of switching devices and the second plurality of switching devices with a pulse width modulated signal having a duty cycle of less than 50%, and adjusting, in the first mode of operation, a resonance link current of the series resonant DC to DC converter by varying the duty cycle of the pulse width modulated signal.

In another embodiment, the power conversion circuit includes a plurality of switching devices. The method may further include operating, in the second mode of operation, the plurality of switching devices with a pulse width modulated signal having a duty cycle of 50% and further having a frequency approximately equal to a resonance frequency of the series resonant DC to DC converter to convert the DC power into a high-voltage DC power.

According to another embodiment of the present invention, a power converter includes a power input configured to receive an input power from a power source, a power output configured to provide an output power to a load, and a battery interface configured to exchange a battery power with a battery, and a power converter circuit coupled to the power input, the power output, and the battery interface. The power converter circuit includes a transformer, a plurality of selectively interconnectable electrical components, a first connection node disposed between at least two of the plurality of selectively interconnectable electrical components and switchably coupled to one of the power input and the transformer, and a second connection node disposed between at least two others of the plurality of selectively interconnectable electrical components and switchably coupled to one of the power input and the transformer. The power converter further includes means for selectively configuring an interconnection of the plurality of electrical components into a first interconnection configuration for converting the input power into the battery power or a second interconnection configuration for converting the battery power into the output power. The second interconnection configuration has a different interconnection of the plurality of electrical components than the first interconnection configuration.

In one embodiment, the plurality of electrical components, in the first interconnection configuration, may include a boost converter. In another embodiment, the plurality of electrical components, in the second interconnection configuration, may include an inverter.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
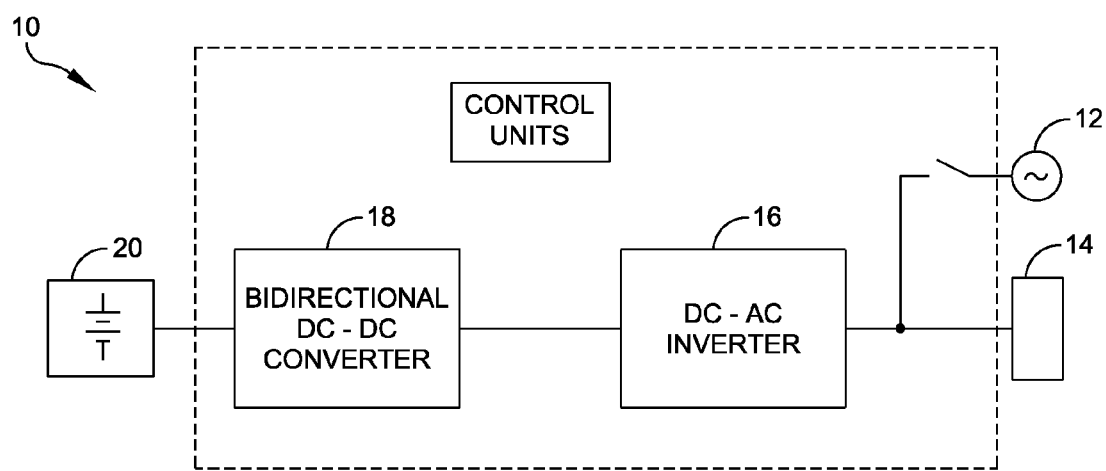
FIG. 1 is a schematic diagram of a typical power converter.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Embodiments of the present invention relate to bi-directional power conversion, such as in an uninterruptible power supply (UPS). A UPS provides a source of backup power in the event that the main power source fails. UPS systems come in a variety of sizes and forms, including those specifically intended for home use, such as for personal computers, televisions, air conditioners, lighting and other equipment that requires AC power. Such systems are popular with consumers desiring or requiring protection from power disruptions, particularly in regions where utility power (also referred to herein as "mains" or "mains power") may be unreliable due to weather or other conditions. A home UPS system typically uses a low-voltage (e.g., 12 V, 24 V, or 48 V), high ampere hour battery as the backup power source. The UPS may perform several functions. When the UPS is providing backup power, it converts power from the low-voltage DC battery into, for example, 120 V or 240 V AC for powering the electrical equipment. When not in use, the battery is kept charged by the UPS using mains power to help ensure that an adequate supply of backup power is ready when mains power becomes unavailable.

According to an aspect of the invention, DC-AC power conversion in a UPS can be achieved using a minimum number of high-voltage components and a simple, low-cost control device, such as a relay, to achieve high utilization of the components in various modes of operation, while also providing high power conversion efficiency. For example, as will be described in further detail below, certain components may be electrically interconnected in one of several configurations, enabling them to have multiple purpose uses, where such uses include operating the power converter as an inverter (for supplying backup power to a load) or as a charger (for charging the battery). This reduces complexity, and also minimizes the number of components having less than full (or nearly full) utilization rates across the various operating modes of the power converter. Further, certain multiple purpose components are controlled in a manner that maximizes power efficiency, and therefore reduces the amount of energy that is wasted, for example, in the form of parasitic heat loss.

According to one embodiment, the power converter has a high-frequency transformer, and selectively configurable circuitry for converting power between AC and DC using a single power conversion channel. The power converter operates in two modes: inverter mode and charger mode. When AC mains power is available, the power converter operates in charger mode to convert the AC power to DC power for charging the UPS battery. In the absence of reliable mains power, the power converter operates in inverter mode to supply AC power to the load using power from the battery.

The power converter includes two cascaded power stages. The first stage is a dual-purpose stage that functions either as an inverter or a charger, depending on the operating mode of the system, and is coupled to AC mains power and the load. The first stage functions as a full-bridge sine wave DC-AC converter when the power converter is operating in inverter mode. When the power converter is operating in charger mode, the first stage functions as a power factor correction (PFC) boost rectifier for generating a regulated DC bus voltage from the unregulated AC mains to feed a DC-DC converter, which is rectified at the low-voltage side of the transformer (e.g., within the second stage). The second stage functions as a DC-DC converter for converting power between the high-voltage first stage and the low-voltage battery. The DC-DC converter includes a high-frequency transformer for stepping up the voltage between the low-voltage battery and the high-voltage load in inverter mode, or for stepping down the voltage between the mains and the battery in charger mode. The inverter and charger functions of the power converter utilize shared components to reduce the total number of components required to perform both functions. The second stage may include a relay or other switching device for selectively interconnecting components of the power converter circuitry into different configurations, for example, a first configuration for DC-to-AC power conversion, and a second configuration for AC-to-DC power conversion.

In another embodiment, the DC-DC converter is configured as a series resonant circuit using a resonance capacitor to establish a resonance frequency of the circuit (e.g., around the switching frequency of the converter). The switching devices of the converter are in a full-bridge configuration and are operated at a 50% duty cycle (including an appropriate dead band) to produce a square-wave voltage output. The switching devices of the DC-DC converter may be operated at the resonance frequency to achieve zero-current switching (e.g., the switching devices are operated when the series resonant circuit current is zero).

In yet another embodiment, the DC-DC converter operates at less than a 50% duty cycle to produce a quasi-square wave voltage output, and there is no resonance capacitor. The switching frequency may be kept constant (for switching on at zero current and off at finite current in inverter mode), but the width of the switching pulses may be varied to control the voltage.

In another embodiment, the DC-DC converter is configured in a push-pull configuration, and the circuit includes a resonance capacitor. In another embodiment, the DC-DC converter is also configured in a push-pull configuration, but there is no resonance capacitor in the circuit.

FIG. 1 shows a schematic of a typical power system 10. The power system 10 is coupled to an AC mains power source 12 and an AC load 14. The power system 10 includes a DC-AC inverter 16 coupled to the AC mains power source 12 and the AC load 14, and a bidirectional DC-DC converter 18 coupled to the DC-AC inverter 16. A battery 20 is coupled to the bidirectional DC-DC converter 18. The power system 10 may form part of an uninterruptible power supply (UPS). The AC mains power source 12 is typically a utility mains that provides an AC electric power supply, for example, single-phase or three-phase 120/240 V at 50/60 Hz, to the UPS. The load 14 is any power-consuming device or combination of devices, such as a computer, television, refrigerator, heating/ventilation/air conditioning system (HVAC), or lighting system. The load 14 may be a critical load that requires a continuous (or nearly continuous) supply of power so that it may continue to operate during black-outs, brown-outs, or whenever the AC mains power source 12 is unavailable. Power may be supplied to the load 14 directly from the AC mains power source 12, or from the battery 20. A control unit 22 may be used to control the operation of the power system 10.

Typically, the battery 20 provides power to the load 14 when, for example, the AC mains power source 12 has failed or is unavailable, such as during a "blackout" or "brown-out." When the AC mains power source 12 is available, it may be used to charge the battery 20. The power system 10 may also provide surge and lightning protection for the load 14. The control unit 22 provides control and monitoring functions for the power system 10, including, but not limited to, mains/battery switching, battery charging, load monitoring, and status/utilization reporting (e.g., locally or remotely through an interface, not shown).

Figure 2:
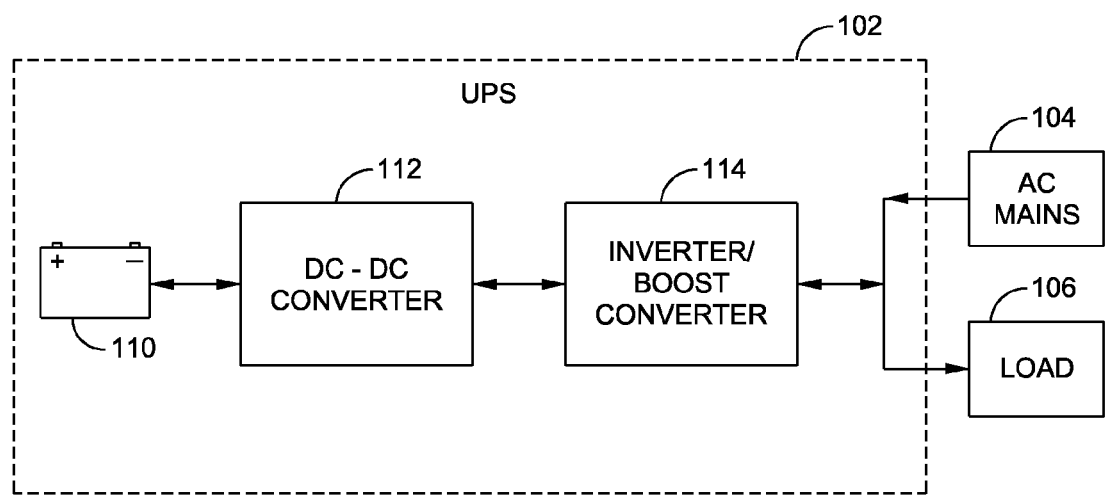
FIG. 2 is a schematic diagram of an exemplary power converter in accordance with one embodiment of the present disclosure.

FIG. 2 shows a schematic of a UPS 102 in accordance with an embodiment of the invention. The UPS 102 is coupled to AC mains 104 and a load 106. The UPS 102 includes a bidirectional power converter that has a DC-DC converter 112 and an inverter/boost converter 114. As used herein, the combined boost rectifier and DC-DC converter is also referred to as a charger. The UPS 102 further includes a battery 110 that is coupled to the DC-DC converter 112, which in turn is coupled to the inverter/boost converter 114, which in turn is coupled to the AC mains 104 and the load 106. For purposes of this disclosure, the inverter/boost converter 114 may be described as one "stage" (e.g., a "first stage") of the bi-directional power converter of the UPS 102, and the DC-DC converter 112 may be described as another "stage" (e.g., a "second stage") of the bi-directional power converter, although it will be understood that the functions of the inverter/boost converter 114 and the DC-DC converter 112 are not necessarily separate or distinct. The battery 110 may be a low-voltage (e.g., 12 V, 24 V, or 48 V), high ampere hour battery, for example, a maintenance-free, sealed lead-acid battery. The UPS 102 may be configured to support loads having a power draw of between approximately 50 watts and approximately 800 watts, and an apparent power of between approximately 350 VA and approximately 1500 VA, although it will be understood that these ratings are non-limiting examples.

The AC mains 104 provides input power to the UPS 102, and the load 106 consumes power from the AC mains 104, the UPS 102, or both. The load 106 may be fed directly from the AC mains 104, or through the UPS 102 using a switching device (not shown) for switching between mains and backup power.

The bi-directional power converter of the UPS 102 has two power conversion stages, such as described above. In a first mode of operation, the inverter/boost converter 114, or the first stage, functions as an inverter that converts DC power from the battery 110 into AC power for the load 106. In a second mode of operation, the inverter/boost converter 114 functions as a rectifier (e.g., a power factor correction (PFC) boost rectifier) that converts AC power from the AC mains 104 into high-voltage DC power for charging the battery 110. The DC-DC converter 112, or the second stage, converts low-voltage DC power at the battery 110 into a high-voltage DC input for the inverter/boost converter 114 when operating in inverter mode, and converts high-voltage DC power from the inverter/boost converter 114 output into low-voltage DC power for charging the battery 110 when operating in charger mode.

Figure 3A:
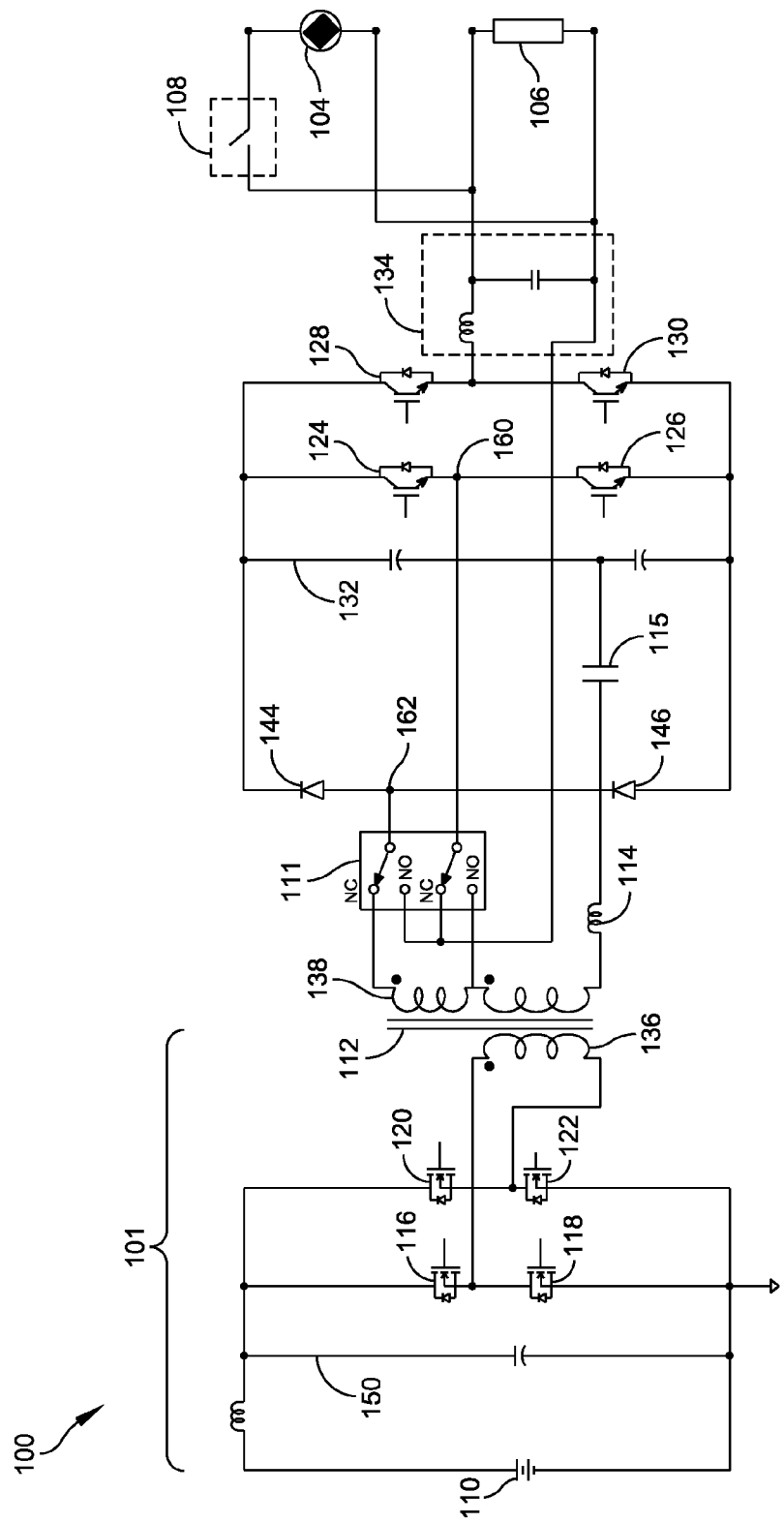
FIGS. 3A, 3B, and 3C schematically illustrate various configurations of an exemplary power converter in accordance with various embodiments of the present disclosure.

FIG. 3A illustrates a schematic circuit diagram of a high-frequency-transformer-based bidirectional power converter 100. The power converter 100 includes two cascaded power conversion stages. The first stage can be configured as an inverter or a boost rectifier, depending on the operating mode of the power converter 100. The second stage includes a DC-DC converter for converting between high voltage DC power and low voltage DC power.

The first stage of the power converter 100 includes switching devices 124, 126, 128, and 130, a first connection node 160 and a second connection node 162. The switching devices 124, 126, 128, and 130 may be insulated gate bipolar transistor (IGBT) devices, metal-oxide-semiconductor field-effect transistor (MOSFET) devices having anti-parallel diodes, or similar devices. The first connection node 160 and the second connection node 162 are each connected to the relay 111. The relay 111 connects, in inverter mode, the first connection node 160 to the load 106 and the second connection node 162 to the transformer 112. The relay 111 connects, in charger mode, the first connection node 160 to the transformer 112 and the second connection node the AC mains 104 (e.g., the neutral).

In inverter mode, as will also be described below with reference to FIG. 3B, switching devices 124, 126, 128, and 130 are interconnected in a full-bridge configuration, or, optionally, in a half-bridge configuration (not shown). Switching devices 124, 126, 128, and 130 are operated with a pulse width modulated (PWM) control signal to generate the desired AC voltage across the load 106 using power from a high-voltage DC bus 132 which is located on the high-voltage side of a transformer 112. The power converter 100 may optionally include a low-pass filter, generally indicated at 134, for filtering the power that is output to the load 106.

In charger mode, as will also be described below with reference to FIG. 3C, switching devices 128 and 130, along with diodes 144 and 146, are configured as a power factor correction (PFC) boost rectifier that feeds power to the high-voltage DC bus 132 from the AC mains 104. The DC-DC converter is configured to be operated in the reverse direction, with respect to inverter mode, to charge the battery 110 from the high-voltage DC bus 132. The relay 111 permits the first stage leg formed by the switching devices 124 and 126 to be shared for use in both inverter and charger modes of operation.

Figure 8:
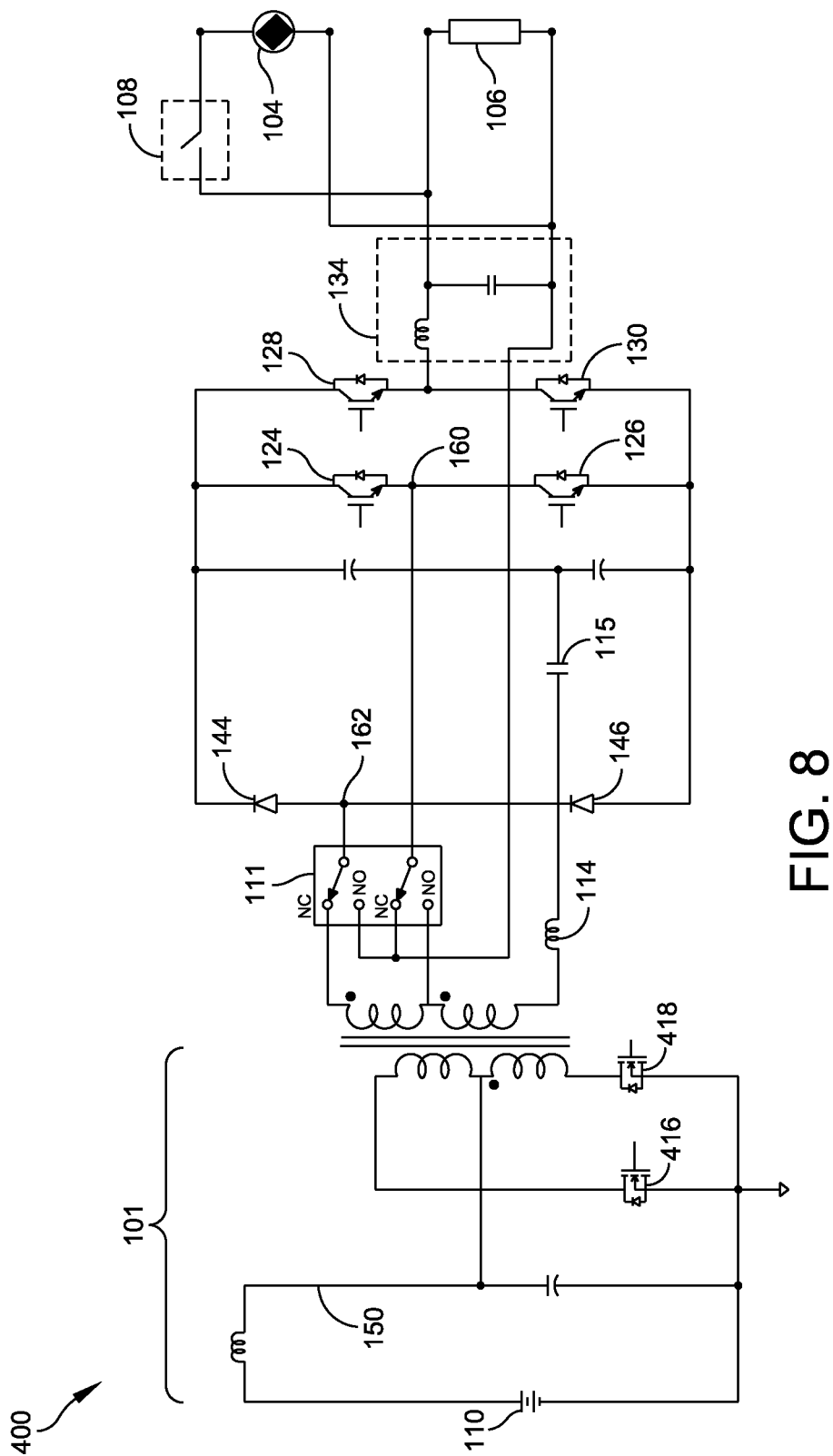
FIG. 8 is a schematic diagram of an exemplary power converter in accordance with yet another embodiment of the present disclosure.
Figure 9:
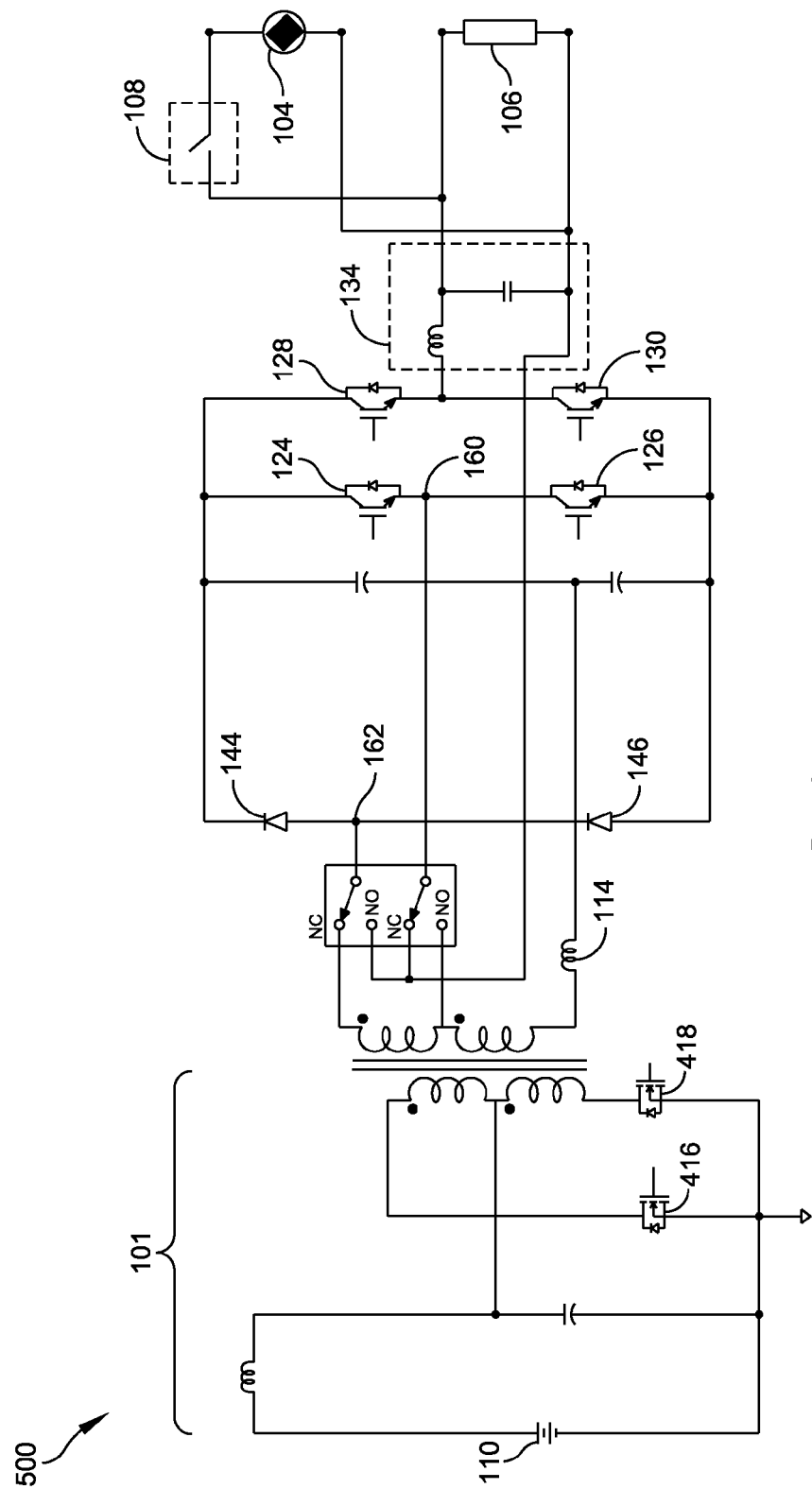
FIG. 9 is a schematic diagram of an exemplary power converter in accordance with another embodiment of the present disclosure.

In the second stage of the power converter 100, the DC-DC converter includes the relay 111, the high-frequency transformer 112, a resonance inductor 114, a resonance capacitor 115, and switching devices 116, 118, 120, and 122. The DC-DC converter is based on a series resonance concept, where the resonance inductor 114 (e.g., transformer leakage inductance) and the resonance capacitor 115 form a portion of a series resonant tank circuit, and also establish a resonant frequency of the circuit (e.g., around the switching frequency of the DC-DC converter). In inverter mode, the DC-DC converter is used to generate a high DC bus voltage (~400V) from the low-voltage battery 110. A low voltage side of the DC-DC converter, as generally indicated at 101, includes switching devices 116, 118, 120, and 122, which are arranged in a full-bridge configuration or, optionally, in a push-pull configuration (e.g., as shown in FIGS. 8 and 9, described below). In the full-bridge configuration, switching devices 116, 118, 120, and 122 are each switched around the resonance frequency of the series resonant tank circuit to achieve zero-current switching, as will be discussed below with reference to FIG. 4. Switching at zero current minimizes power losses and achieves a higher power efficiency compared to hard switching (e.g., switching at a non-zero current).

As illustrated in FIG. 3A, some of the electrical components illustrated in FIG. 3A are selectively interconnectible into either an inverter configuration or a charger configuration using a relay 111. That is, each of the inverter and charger functions are achieved by selectively arranging the electrical couplings between certain electrical components into different configurations to create different circuits, as described in further detail below with reference to FIGS. 3B and 3C. The multiple purpose nature of these certain components minimizes the total number of components required to perform all functions of the power converter 100.

In the embodiment of FIG. 3A, the power converter 100 functions as an inverter that converts DC power from the battery 110 to AC power for the load 106 when the power converter is operating in an inverter mode, and alternatively functions as a charger that charges the battery using the AC mains 104 when the power converter is operating in a charger mode. The AC mains 104 may, for example, be coupled to a utility power grid, a generator, or other external power source. The load 106 may be a computer, server, display, storage device, cooling device, or any other electricity-consuming device, in particular, devices that are compatible with power converter 100. An AC mains relay 108 may optionally be included to isolate the power converter 100 from the AC mains 104, for example, during inverter mode operation. Such isolation may be necessary to prevent power from the power converter 100 from back-feeding the utility power grid and/or to protect the load 106 from power spikes, surges, or brown-outs that may occur at the AC mains 104. The AC mains relay 108 may be controlled by a control unit, such as the control unit 22 described above with reference to FIG. 1, or by an autonomous, power-sensing control device (not shown).

As will be described in further detail below with respect to FIGS. 3B and 3C, the power converter 100 is selectively configurable to operate in an inverter mode for supplying power to the load 106 from the battery 110 when, for example, AC mains 106 is unavailable. The power converter 100 is also selectively configurable to operate in a charger mode for charging the battery 110 using power from the AC mains 104 when, for example, the AC mains is available. The selection of inverter mode and/or charging mode may be automatically performed by a controller, such as the control unit 22 described above with reference to FIG. 1, and/or manually by a user. For example, the operating mode of the power converter 100 may switch from charging mode to inverter mode when the AC mains 104 power falls outside of certain operational parameters, including but not limited to a voltage operating range that the load 106 is rated to operate within.

Figure 3B:
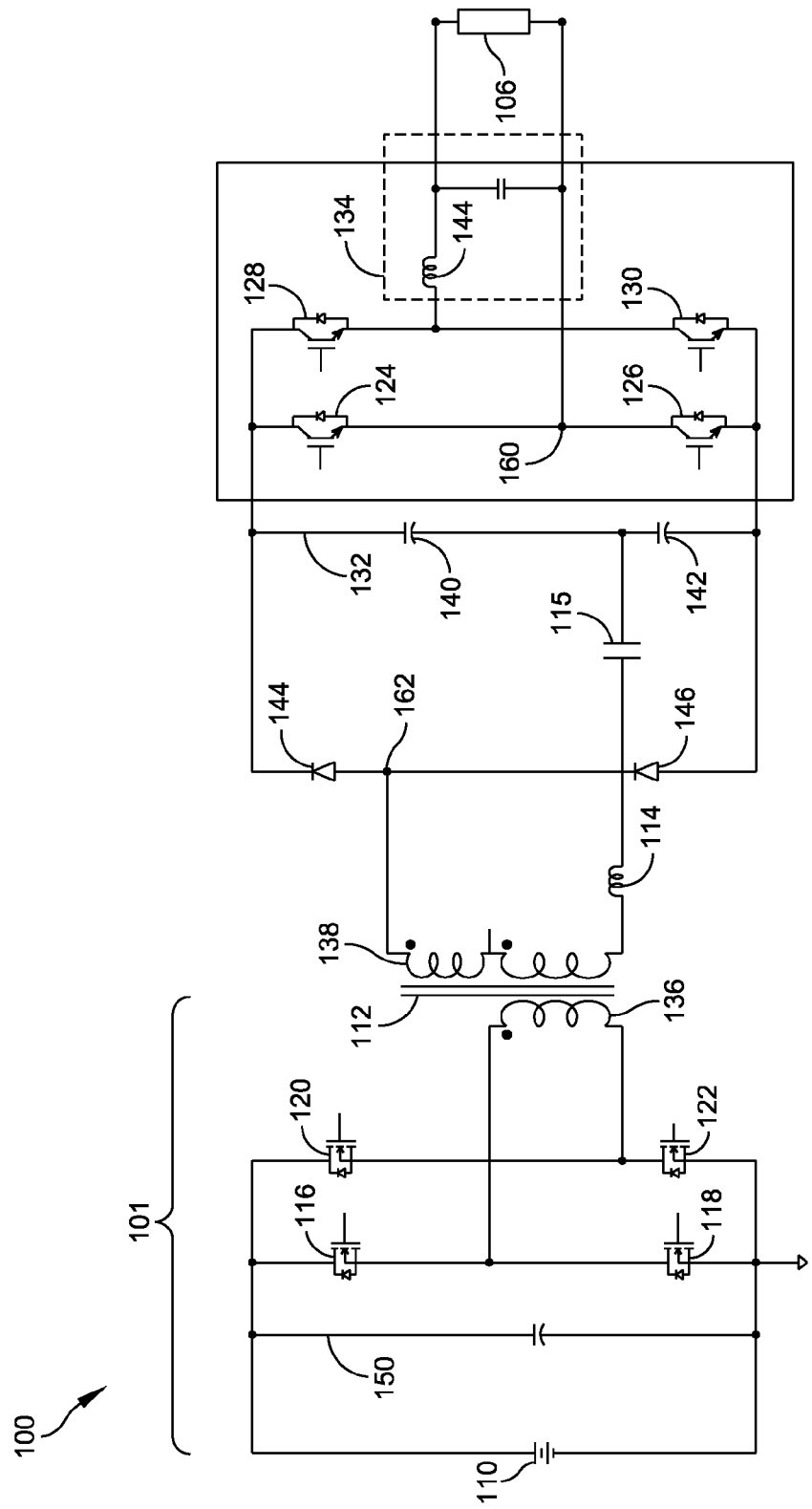

FIG. 3B illustrates a schematic diagram of the power converter 100, as shown in FIG. 3A, when configured for inverter mode operation. FIG. 3B is a simplified illustration, with certain elements not shown for clarity. The power converter 100 is selectively configurable to operate in an inverter mode, whereby low-voltage DC battery power supplied by the battery 110 is converted to high-voltage AC output power for consumption by the load 106, and the AC mains (not shown) is disconnected from the circuit (e.g., using AC mains relay 108, as shown in FIG. 3A). The relay 111, shown in FIG. 3A, is in a normally closed position in inverter mode operation. A bridge formed by switching devices 116, 118, 120, and 122 is included in the low-voltage side of the DC-DC converter 101. A high-voltage winding 138 of the transformer 112 feeds power to the high-voltage DC bus 132 (e.g., as formed by a leg including capacitors 140 and 142) through a series resonant filter that includes the resonance inductor 114 and the resonance capacitor 116, and diodes 144 and 146. The resonance inductor 114 includes the leakage inductance of the transformer 112 and the layout inductance referred to the high-voltage side of the transformer.

Switching devices 116, 118, 120, and 122 are operated with 50% duty cycle PWM signal with an appropriate dead band to impose a square wave voltage at the switching frequency across a low-voltage winding 136 of the transformer 112. The switching frequency of switching devices 116, 118, 120, and 122 of the DC-DC converter may be set around the resonance frequency of the resonance tank circuit including resonance inductor 114 and the resonance capacitor 116 such that the switching devices 116, 118, 120 and 122 are turned on and off when the current through the switching devices, and therefore, at the low-voltage winding 136 of the transformer 112, is zero. Further, diodes 144 and 146 will commute at zero current. This significantly reduces the switching loss of the DC-DC converter and helps achieve higher power conversion efficiency compared to case when the bridge is operated with hard switching. The output voltage of the DC-DC converter may be left unregulated (as this variation may be controlled at the inverter), or it may optionally be regulated by slightly adjusting the switching frequency of the DC-DC converter. The turns ratio of low-voltage windings 136 to high-voltage windings 138 of transformer 112 is selected to support the rated load at rated output voltage and minimum battery voltage without causing any clamping at the peak of the output voltage.

Figure 4:
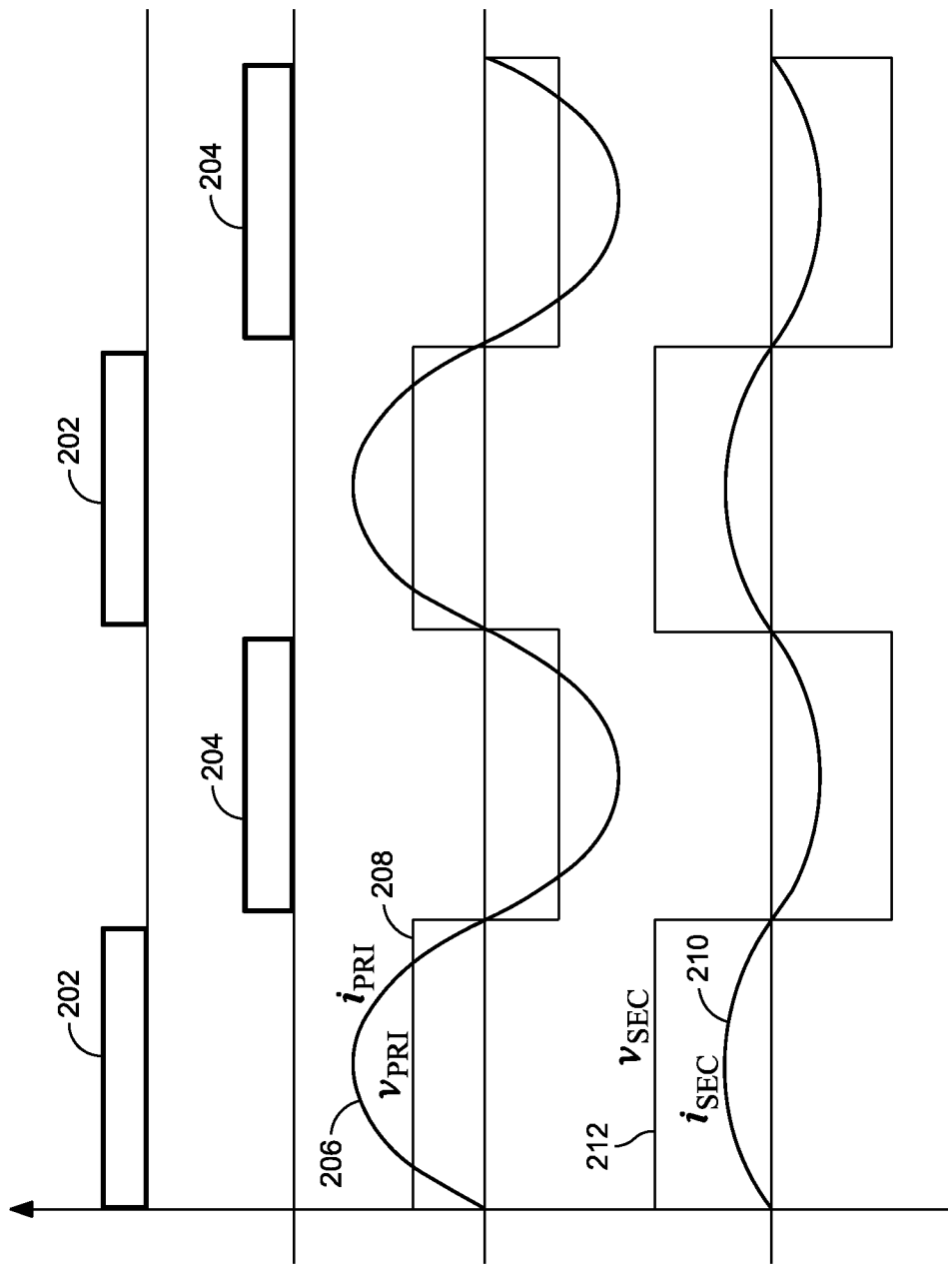
FIG. 4 illustrates various waveforms associated with an exemplary power converter configured for inverter mode of operation, in accordance with various embodiments of the present disclosure.

FIG. 4 illustrates certain waveforms associated with the DC-DC resonant converter configured for inverter mode of operation, as shown in FIG. 3B. Waveform 202 represents control signals for operating switching devices 116 and 122, and waveform 204 represents control signals for operating switching devices 118 and 120. Waveforms 206 and 208 represent a current and voltage, respectively, on the low-voltage side of the transformer 112 (e.g., at the low-voltage winding 136). Waveforms 210 and 212 represent a current and voltage, respectively, on the high-voltage side of the transformer 112 (e.g., at the high-voltage winding 138). As described above with respect to FIG. 3B, the switching devices of the low-voltage DC bridge are operated with a 50% duty cycle PWM signal (e.g., as shown by waveforms 206 and 208) at the resonance frequency of the resonant tank circuit to ensure zero current switching operation at all times (e.g., as shown by waveforms 208 and 210). The primary coil current 206, flowing through the transformer 112, is therefore sinusoidal at the switching frequency of the resonant tank circuit.

Figure 3C:
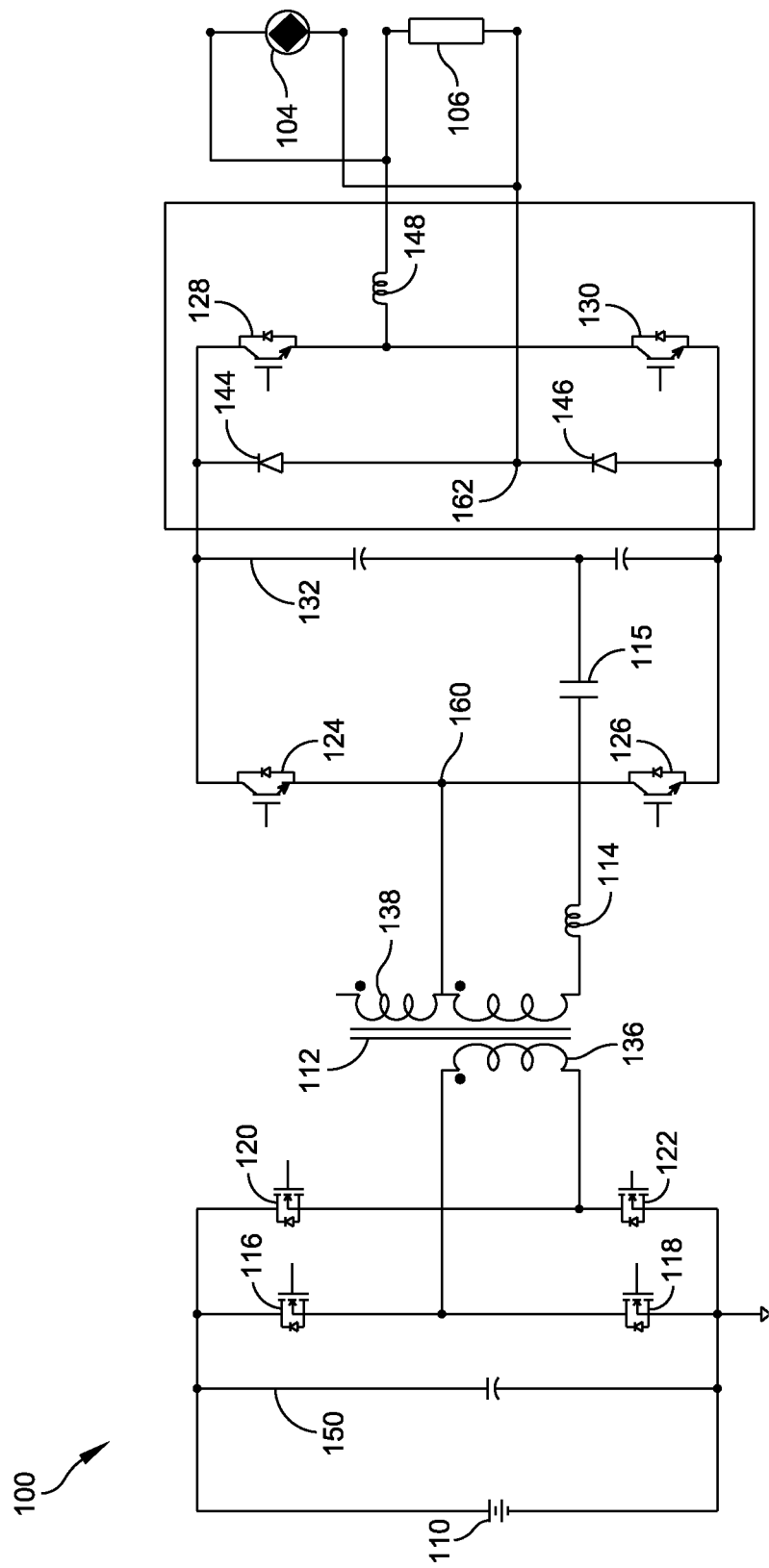

FIG. 3C illustrates a schematic diagram of the power converter 100, as shown in FIG. 3A, when configured for charger mode operation. FIG. 3C is a simplified illustration, with certain elements not shown for clarity. The power converter 100 is selectively configurable to operate in a charger mode, whereby high-voltage AC input power supplied by AC mains 104 is converted to low-voltage DC battery power to charge the battery 110. The AC mains relay 108 is closed to connect AC power to the circuit. The relay 111 is in a normally open position. The load 106 may be fed directly from the AC mains 104.

The converter formed by switching devices 128 and 130, diodes 144 and 146, and the high-voltage DC bus 132 acts as a power factor correction (PFC) boost converter with the inductor 148 functioning as a boost inductor. During the positive-half line cycle, switching device 130 acts as a boost switch (operated with a PWM signal), and the anti-parallel body diode of the switching device 128 acts as a boost diode. The return current flows through diode 146, which remains on continuously during this period. During negative-half line cycle, switching device 128 acts as the boost switch while the anti-parallel body diode of switching device 130 acts as the boost diode. Diode 144 continuously conducts for the entire negative-half line cycle. The boost converter maintains a fixed voltage across the high-voltage DC bus 132 for a wide range of input voltages.

The converter formed by switching devices 124 and 126, the high-voltage DC bus 132, the resonance elements including the resonance inductor 114 and the resonance capacitor 116, the transformer 112, the low-voltage switching devices 116, 118, 120, and 122, and the low-voltage DC bus 150 act as a series resonant DC-DC converter, which transfers energy from the high-voltage DC bus 132 to the low-voltage DC bus 150 to charge the battery 110. The first connection node, indicated at 160, couples the high-voltage DC bus 132 to a point on the high-voltage windings 138 of the transformer 112 that is different with respect to inverter mode operation to reduce the turns ratio between the low-voltage windings 136 and the high-voltage windings. Switching devices 124 and 126 are operated with a PWM control signal to impress a voltage across the high-voltage windings 138 of the transformer 112. The resultant voltage across the low-voltage windings 136 may be rectified through the anti-parallel body diodes of switching devices 116, 118, 120, and 122 before feeding power to the low-voltage DC bus 150. In one embodiment, to avoid large conduction losses in the anti-parallel body diodes, switching devices 116, 118, 120, and 122 are turned on and off in synchronization with switching devices 124 and 126 to achieve synchronous rectification.

Unlike in the inverter mode of operation, the battery charging current is precisely controlled in charging mode. The battery charging current is controlled by controlling a current in the high-voltage windings 138 (i.e., the resonance link current). To control the high-voltage windings current, one of two different techniques is used. According to the first technique, switching devices 116, 118, 120, 122, 124 and 126 of the DC-DC converter are operated with a 50% duty cycle PWM (e.g., a square wave) signal, and the link current is regulated by adjusting the switching frequency of the converter. The various waveforms of the DC-DC converter for this technique are similar to those shown in FIG. 4.

According to the second technique, switching devices 116, 118, 120, 122, 124 and 126 of the DC-DC converter are operated with a quasi-square wave PWM signal, where the switching frequency of the converter is kept constant and the link current is controlled by varying the duty cycle of the PWM signal. The various waveforms of the DC-DC converter under this approach are shown in FIG. 5.

Figure 5:
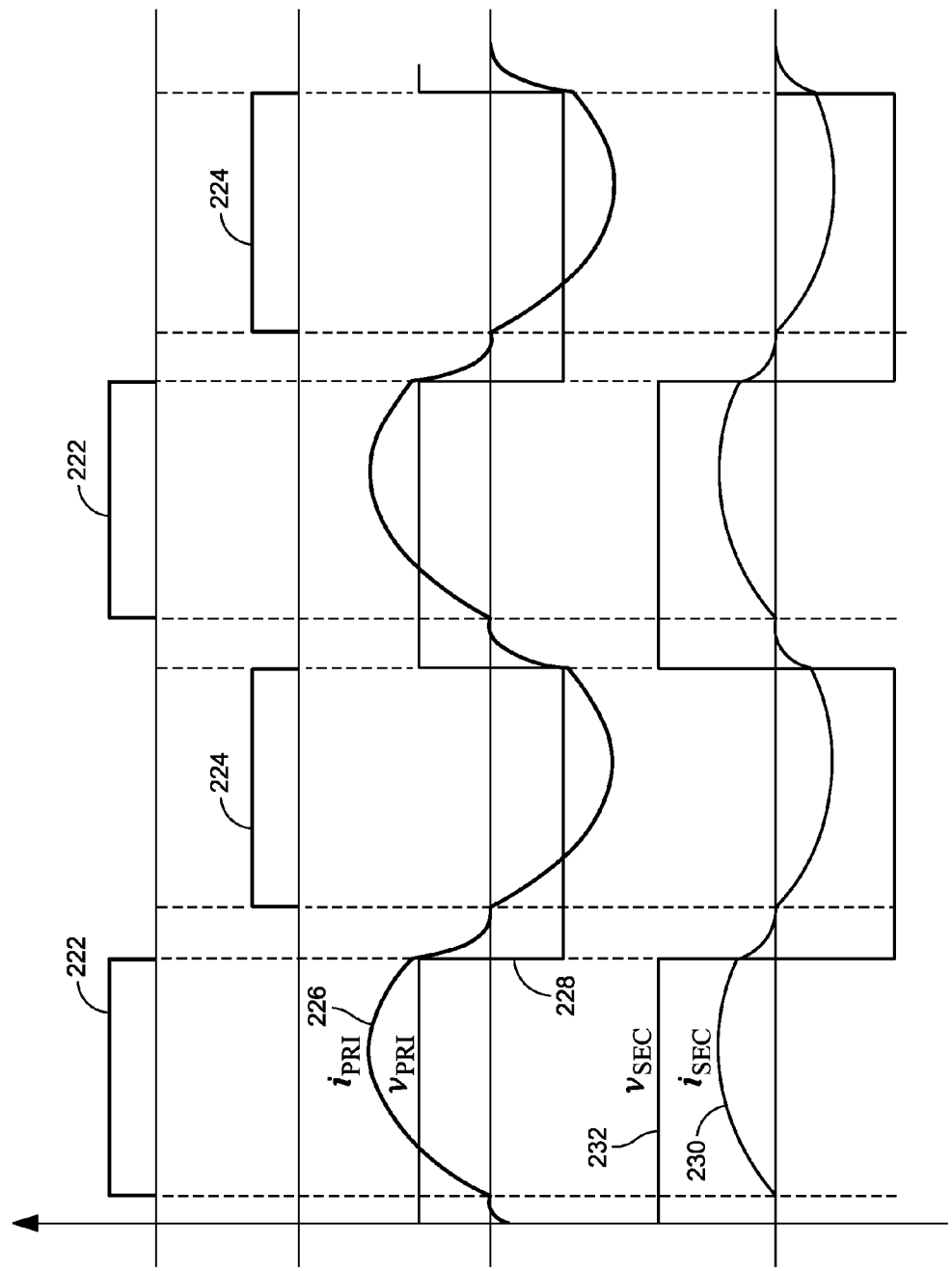
FIG. 5 illustrates various waveforms associated with an exemplary power converter configured for charger mode of operation, in accordance with various embodiments of the present disclosure.

FIG. 5 illustrates certain waveforms associated with the DC-DC resonant converter configured for charger mode of operation, shown in FIG. 3C. Waveforms 222 and 224 each represent control signals for switching devices 116, 122, and 124, and 118, 120, and 126, respectively. Waveforms 226 and 228 represent a current and voltage, respectively, on the low-voltage side of transformer 112 (e.g., at the low-voltage winding 136). Waveforms 230 and 232 represent a current and voltage, respectively, on the high-voltage side of transformer 112 (e.g., at the high-voltage winding 138). As illustrated by waveforms 222 and 224, switching devices 116, 122, and 124, and 118, 120, and 126, respectively, are switched using a quasi-square wave PWM signal. Each switching device is turned on when there is zero current through itself, i.e., there is zero current at the low-voltage winding 136 of transformer 112, as indicated by waveform 226, but turn off at a finite, non-zero current. The voltage across the high-voltage winding 138 of the transformer 112, as indicated by waveform 232, may be controlled by varying the PWM control signals 222 and 224.

Figure 6:
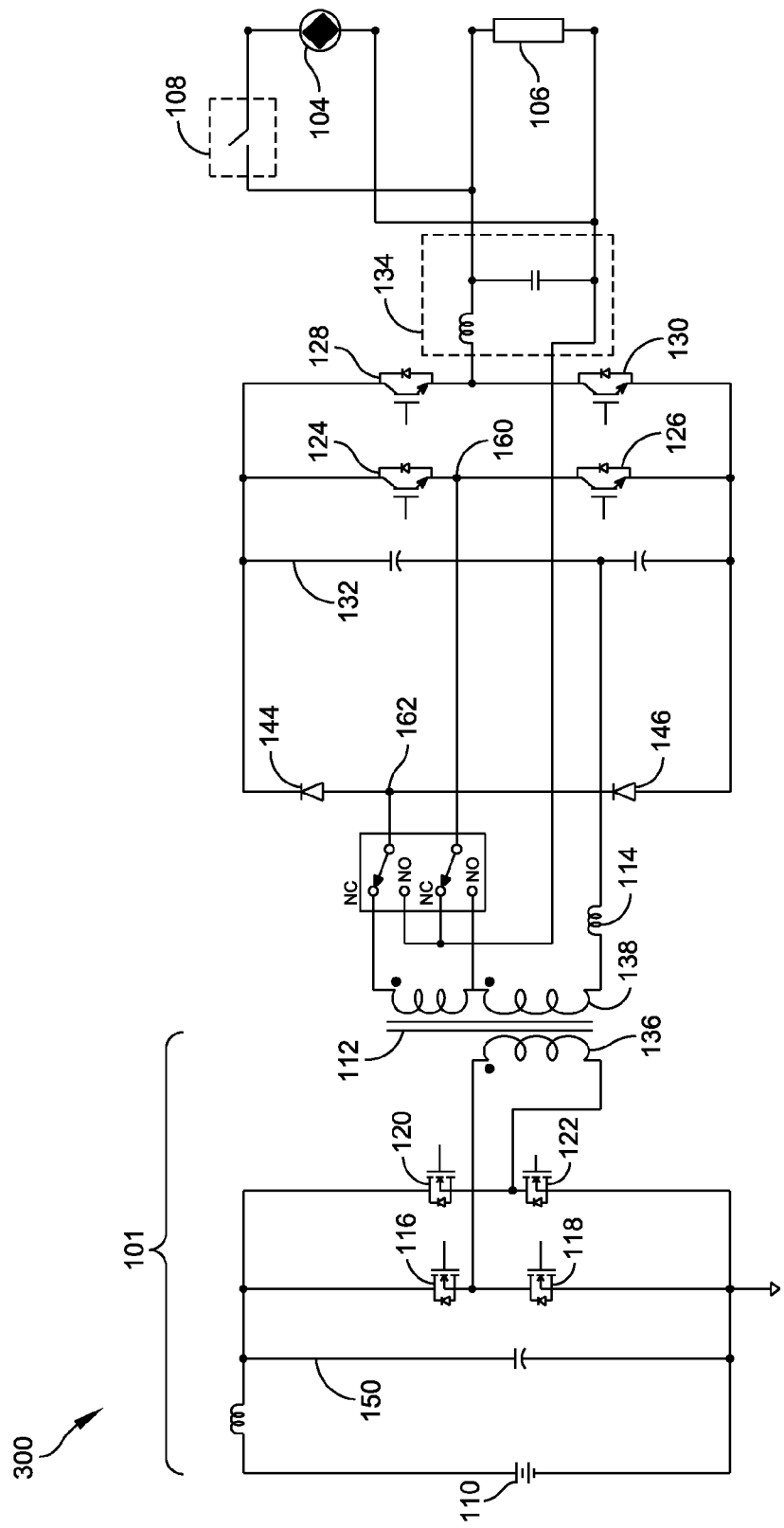
FIG. 6 is a schematic diagram of an exemplary power converter in accordance with another embodiment of the present disclosure.

FIG. 6 illustrates a schematic circuit diagram for a high-frequency-transformer-based bidirectional power converter 300 in accordance with another embodiment. The power converter 300 is substantially similar to power converter 100 described above with reference to FIG. 3A, except that the power converter 300 does not include a resonance capacitor (e.g., resonance capacitor 115 as shown in FIG. 3A, and common elements are identified using the same reference numbers).

Figure 7:
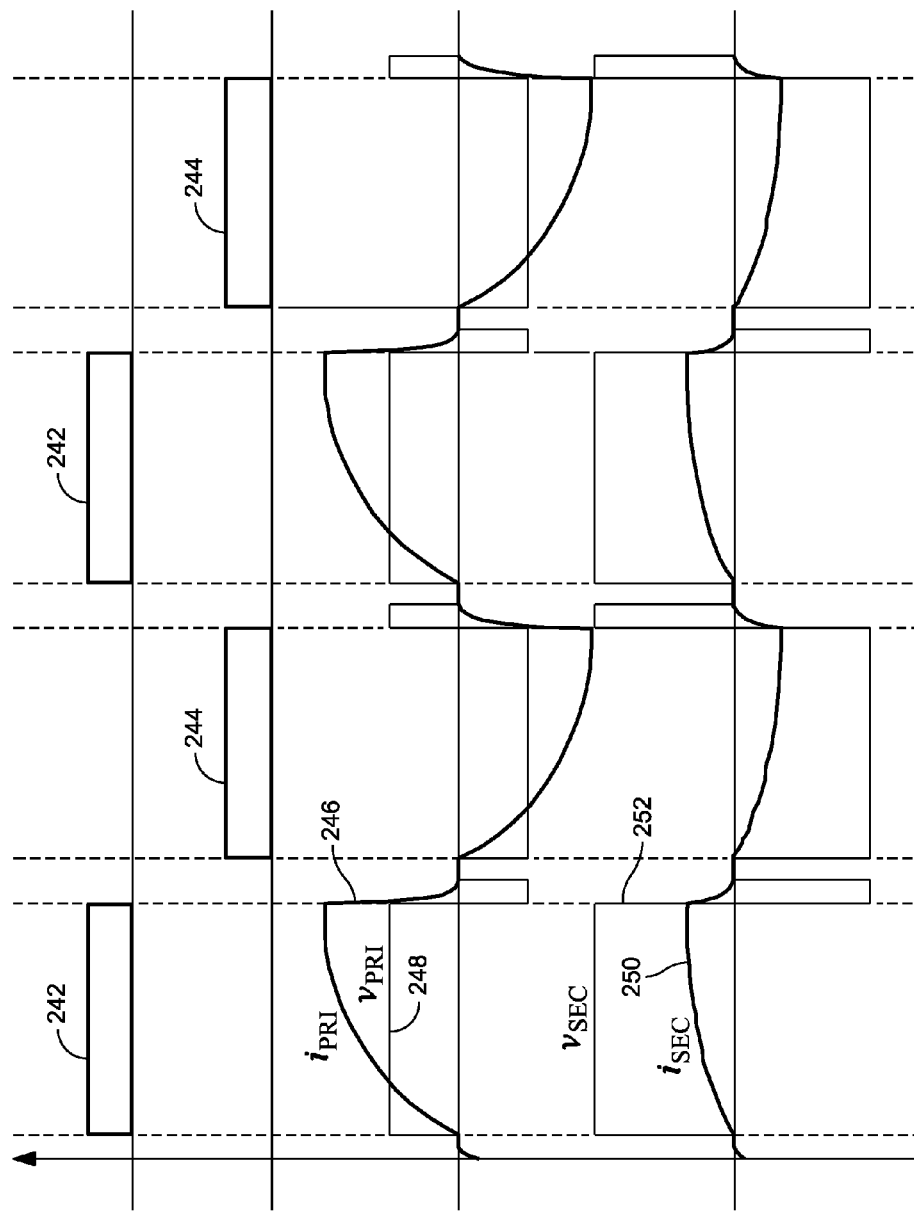
FIG. 7 illustrates various waveforms associated with an exemplary power converter in accordance with another embodiment of the present disclosure.

FIG. 7 illustrates certain waveforms associated with the DC-DC resonant converter of the power converter 300, shown in FIG. 6, configured for inverter mode of operation. Waveforms 242 and 244 each represent control signals for low-voltage switching devices 116 and 122, and 118 and 120, respectively. Waveforms 246 and 248 represent a primary coil current and voltage, respectively, on the low-voltage side of the transformer 112 (e.g., at the low-voltage winding 136). Waveforms 250 and 252 represent a secondary coil current and voltage, respectively, on the high-voltage side of the transformer 112 (e.g., at the high-voltage winding 138).

In inverter mode, the low-voltage switches 116, 118, 120, and 122 are switched at a duty cycle of less than 50%, as illustrated by waveforms 242 and 244 of FIG. 7, which applies a quasi-square wave voltage across the low-voltage windings 136 of the transformer 112. A primary current through the transformer 112, as illustrated by waveform 246 of FIG. 7, rises exponentially (e.g., due to MOSFET, joints, transformer and layout resistances). The primary current 246 drops to zero quickly after all of the low-voltage switching devices 116, 118, 120, and 122 are turned off (e.g., due to low transformer leakage and layout inductances). Accordingly, the low voltage switching devices 116, 118, 120, and 122 are turned on at zero current and turned off at finite current.

In charger mode, the switching devices 124 and 126 are controlled with a PWM signal to impress a quasi-square wave voltage across the high-voltage windings 138. Switching devices 116, 118, 120, and 122 are operated in synchronization with switching devices 124 and 126 to achieve synchronous rectification. The operations of the inverter and PFC boost converter are substantially similar to the power converter 100 described above with reference to FIGS. 3A, 3B, and 3C.

FIG. 8 illustrates a schematic circuit diagram for a high-frequency-transformer-based bidirectional power converter 400 in accordance with yet another embodiment. The power converter 400 is substantially similar to the power converter 100 described above with reference to FIG. 3A, except that the full-bridge configuration of the switching devices at the low-voltage side of the DC-DC converter of power converter 100 is replaced with a push-pull configuration in power converter 400, as shown with respect to switching devices 416 and 418.

The operation of the power converter 400 is substantially similar to the operation of the power converter 100 described above with reference to FIGS. 3A, 3B, and 3C. In inverter mode of operation, switching devices 416 and 418 are operated with gating pulses 202 and 204, respectively, as shown in FIG. 4. In charger mode of operation, switching devices 418 and 416 are switched in synchronization with the switching devices 124 and 126 of the high-voltage side of the converter, respectively, to achieve synchronous rectification for higher power conversion efficiency. The transformer voltage and current waveforms are similar to those shown in FIGS. 4 and 5 under inverter and charger modes of operation, respectively.

FIG. 9 illustrates a schematic circuit diagram for a high-frequency transformer-based bidirectional power converter 500 in accordance with another embodiment. The power converter 500 is substantially similar to the power converter 400 described above with reference to FIG. 8, except that the power converter 500 does not include a resonance capacitor (e.g., resonance capacitor 115 as shown in FIG. 8). The operation of the DC-DC converter in power converter 500 is substantially similar to the operation of the DC-DC converter in the power converter 300 described above with reference to FIG. 6, except that the full-bridge configuration of the switching devices at the low-voltage side of the DC-DC converter in power converter 300 is replaced with a push-pull configuration in power converter 500, as shown with respect to switching devices 416 and 418.

Figure 10:
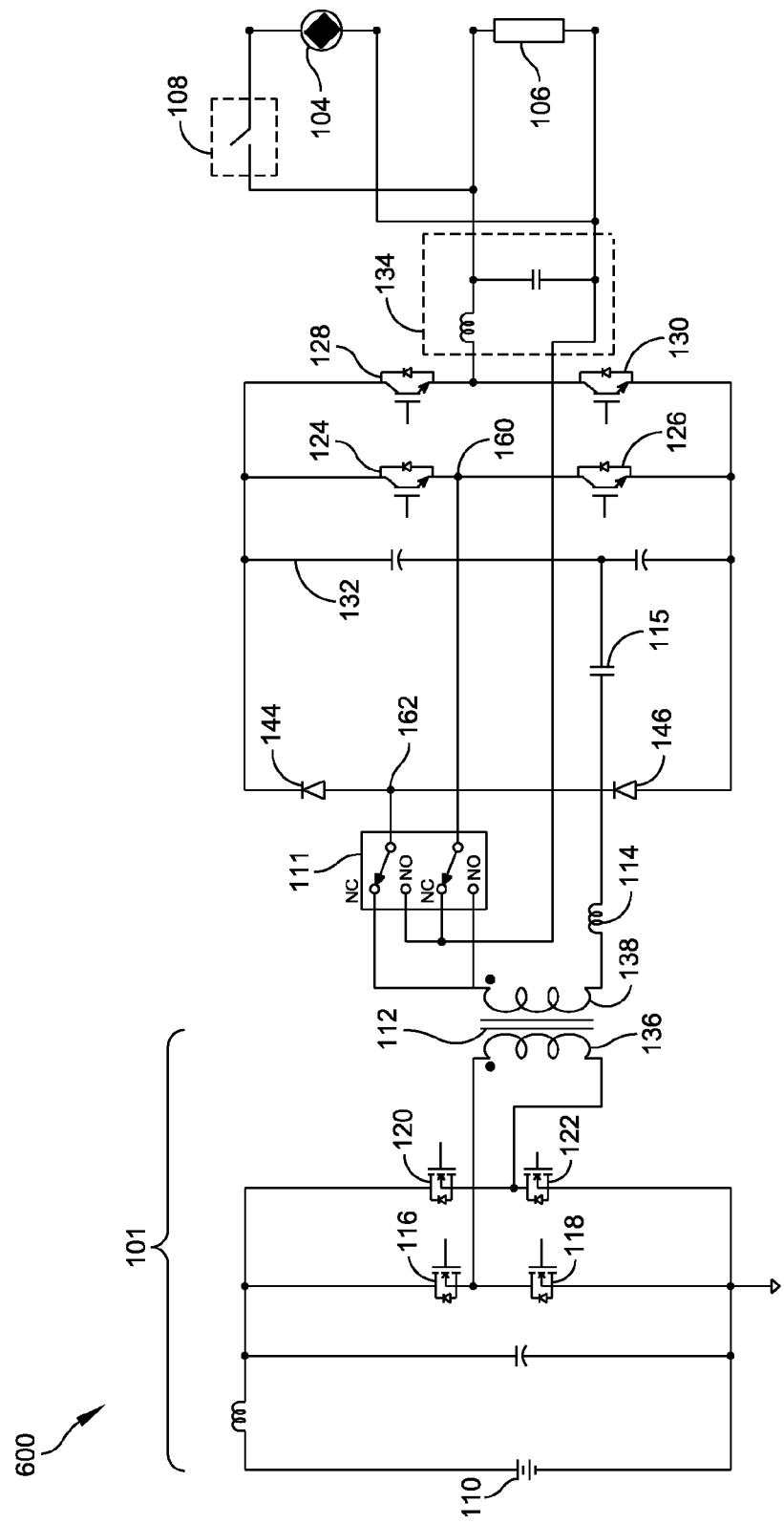
FIG. 10 is a schematic diagram of an exemplary power converter in accordance with another embodiment of the present disclosure.

FIG. 10 illustrates a schematic circuit diagram for a high-frequency transformer-based bidirectional power converter 600 in accordance with another embodiment. The power converter 600 is substantially similar to the power converter 100 described above with reference to FIGS. 3A, 3B and 3C, except that the power converter 600 has only one tap on the high-voltage windings 138 of the transformer 112 (e.g., coupled, as shown, to the relay 111). The operation of the DC-DC converter in power converter 600 is substantially similar to the operation of the DC-DC converter in the power converter 100, except that, in charger mode of operation, the battery charging current is controlled by phase shifting the gating pulses of switching devices 116 and 122 with respect to the gating pulse of switching devices 124, and further by phase shifting the gating pulses of switching devices 118 and 120 (e.g., waveforms 202 and 204 in FIG. 4, and waveforms 222 and 224 in FIG. 5) with respect to the gating pulse of switching device 126 (not shown separately in FIG. 4 or 5). Otherwise, the transformer voltage and current waveforms are similar to those shown in FIGS. 4 and 5 under inverter and charger modes of operation, respectively. The full-bridge configuration of the switching devices at the low-voltage side of the DC-DC converter of power converter 600 may be replaced with a push-pull configuration, such as described above with respect to power converter 400 and shown in FIG. 8 with respect to switching devices 416 and 418.

Figure 11:
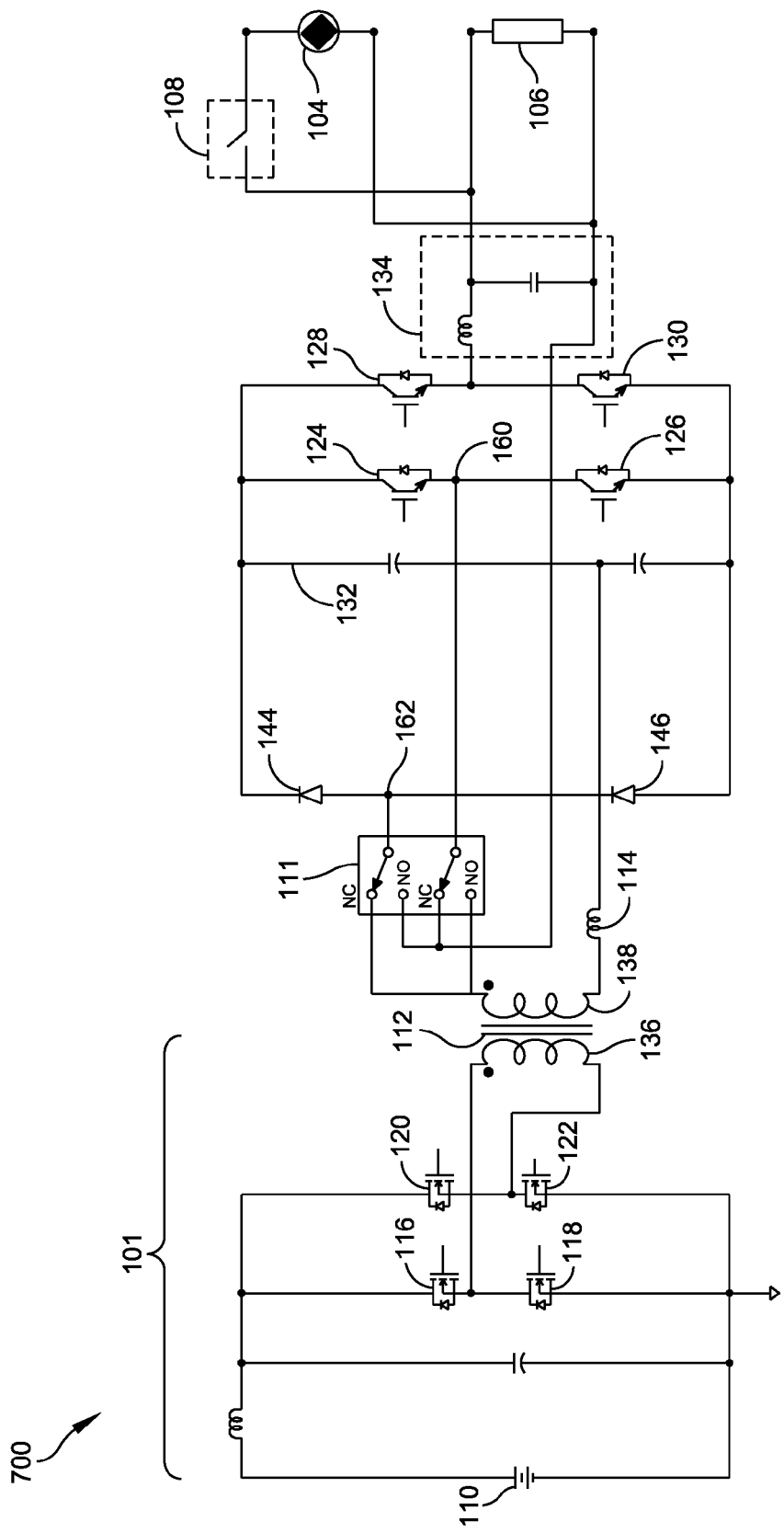
FIG. 11 is a schematic diagram of an exemplary power converter in accordance with another embodiment of the present disclosure.

FIG. 11 illustrates a schematic circuit diagram for a high-frequency transformer-based bidirectional power converter 700 in accordance with another embodiment. The power converter 700 is substantially similar to the power converter 600 described above with reference to FIG. 10, except that the power converter 700 does not include a resonance capacitor (e.g., resonance capacitor 115 as shown in FIG. 10, and common elements are identified using the same reference numbers). The full-bridge configuration of the switching devices at the low-voltage side of the DC-DC converter of power converter 700 may be replaced with a push-pull configuration, as described above with respect to power converter 400 and shown in FIG. 8 with respect to switching devices 416 and 418.

As described herein, embodiments of the invention can provide a power converter that has a higher reliability than prior art power converters due to a simplified power circuit topology (e.g., the topology has fewer devices, operates at a lower voltage and incurs less thermal stress, results in lower manufacturing costs, and has a simple sensing and control schema). For example, according to one embodiment, the low-voltage devices are switched at zero current, which reduces power loss and heat output. Additionally, the same power converter circuit operates as both an inverter and a charger using a single transformer, leading to a high converter utilization factor. In various embodiments, the power conversion efficiency is greater than approximately 90%. In one embodiment, the power converter utilizes a PFC-based charging mode.

In one embodiment, a power converter includes a power input configured to receive an input power from a power source, a power output configured to provide an output power to a load, and a battery interface configured to exchange a battery power with a battery. The apparatus further includes power converter circuitry coupled to the power input, the power output, and the battery interface. The power converter circuitry includes a plurality of selectively interconnectable electrical components adapted to, in a first interconnection configuration, convert the input power into the DC power, and in a second interconnection configuration, convert the DC power into the output power. The second interconnection configuration has a different interconnection of the electrical components than the first interconnection configuration.

In any of the preceding embodiments, the power converter can be implemented within a UPS, for example, a UPS having a DC battery. The UPS may be adapted to provide backup power for any number of power consuming devices, such as personal computers, printers, displays, televisions, telephones, and so forth. The UPS may contain, or be coupled to, a controller or control unit to control the operation of the power converter. For example, the controller may provide the control waveforms 202 and 204, as shown in FIG. 4, control waveforms 222 and 224, as shown in FIG. 5, or control waveforms 242 and 244, as shown in FIG. 7. The controller may provide control signals for relay 108, 111, or both. In general, the controller controls the operation of the power converter such that it charges a DC power source (e.g., the battery 110) from the AC power source (e.g., the AC mains 104) when power is available from the AC power source, and inverts DC power from the DC power source to AC output power (e.g., for consumption by the load 106) when, for example, the AC power source is unavailable or offline. The controller can include hardware, software, firmware, a processor, a memory, an input/output interface, a data bus, and/or other elements in any combination that may be used to perform the respective functions of the controller.

In any of the preceding embodiments, the power converter can be bi-directional (e.g., to convert power from DC to AC and from AC to DC). The DC power source may be any of batteries, fuel cells, photovoltaics, or DC micro turbines. It should be recognized that the DC power source is not limited to the preceding and may be any source or combination of sources of DC power.

In one or more of the preceding embodiments, the switching devices may be any electronic or electromechanical device that conducts current in a controlled manner (e.g., by using a control signal) and can isolate a conductive path. Representations of various switching devices, and other electronic devices, in the figures are exemplary and not intended to be limiting, as it will be appreciated by one skilled in the art that similar or identical functionality may be obtained using various types, arrangements, and configurations of devices. For example, one or more of the switching devices may contain one or more anti-parallel diodes, or such diodes may be separate from the switching devices. As indicated above, in some embodiments, the switching devices include a rectifier, for example, a controlled rectifier that can be turned on and off with the application of a control signal (e.g., an SCR, a thyristor, etc.). Additionally, other devices, such as resistors, capacitors, inductors, batteries, power supplies, loads, transformers, relays, diodes, and the like may be included in a single device, or in a plurality of connected devices.

In some embodiments, the power converter includes a DC-to-DC boost/buck converter topology, while in other embodiments the power converter includes a DC-to-DC push-pull converter topology. It should be appreciated that other topologies may be utilized, including buck, boost, half-bridge, full-bridge, and so forth. It should be further appreciated that the topologies may be hard switched or resonant.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, the gating pulses used to operate the switching devices of the power converter may vary in frequency, duty cycle, or both. Further, alternative configurations of electrical components may be utilized to produce similar functionality, for example, inverter and charger functions, or other functions. Accordingly, the foregoing description and drawings are by way of example only.

What is claimed is:

1. A power converter, comprising:
   a power input configured to receive input power from an AC power source;
   a power output configured to provide output power to a load;
   a battery interface configured to exchange DC power with a battery; and
   power converter circuitry coupled to the power input, the power output, and the battery interface, the power converter circuitry adapted to, in a first interconnection configuration, convert the input power into the DC power at the battery interface, and further adapted to, in a second interconnection configuration, convert the DC power at the battery interface into the output power, the power converter circuitry having:
   a power line coupled to at least one of the power input and the power output;
   a transformer;
   a first connection node switchably connected to the power line in the first interconnection configuration and switchably connected to the transformer in the second interconnection configuration; and a second connection node switchably connected to the transformer in the first interconnection configuration and switchably connected to the power line in the second interconnection configuration.

2. The power converter of claim 1, wherein the power converter circuitry includes a relay coupled to the first connection node, the second connection node, the power line and the transformer for interconnecting the first connection node, the second connection node, the power line and the transformer into one of the first interconnection configuration and the second interconnection configuration.

3. The power converter of claim 1, further comprising a controller coupled to the power converter circuitry and configured to select one of the first interconnection configuration and the second interconnection configuration based upon the input power received at the power input.

4. The power converter of claim 1, wherein the first interconnection configuration of the power converter circuitry includes a boost converter.

5. The power converter of claim 1, wherein the second interconnection configuration of the power converter circuitry includes an inverter.

6. The power converter of claim 5, wherein the inverter includes a plurality of switching devices configured in one of a full-bridge configuration and a half-bridge configuration.

7. The power converter of claim 1, wherein the power converter circuit includes a DC-to-DC converter configured as one of a full-bridge converter and a push-pull converter.

8. The power converter of claim 7, wherein the DC-to-DC converter includes a series resonant power converter.

9. The power converter of claim 8, wherein the DC-to-DC converter includes a high-frequency transformer.

10. The power converter of claim 1, further comprising the battery coupled to the battery interface.

11. The power converter of claim 10, wherein the power converter is included in an uninterruptible power supply.

12. The power converter of claim 1, wherein the transformer has a first tap and a second tap, wherein the first connection node is switchably connected to the first tap of the transformer in the second interconnection configuration, and wherein the second connection node is switchably connected to the second tap of the transformer in the first interconnection configuration.

13. A method of converting power in an uninterruptible power supply, the method comprising:
    connecting, in a first mode of operation, a first connection node of a power conversion circuit to an AC power source;
    connecting, in the first mode of operation, a second connection node of the power conversion circuit to a transformer;
    receiving, in the first mode of operation, input power from the AC power source;
    converting the input power into DC power during the first mode of operation;
    connecting, in a second mode of operation, the first connection node to the transformer;
    connecting, in the second mode of operation, the second connection node to a load;
    receiving, in the second mode of operation, the DC power from a DC power source; and
    converting the DC power into output power during the second mode of operation.

14. The method of claim 13, wherein the power conversion circuit includes a plurality of switching devices, and wherein the method further comprises operating, in the first mode of operation, the plurality of switching devices with a square wave pulse width modulated signal to convert the input power into a high-voltage DC power.

15. The method of claim 14, wherein the plurality of switching devices is a first plurality of switching devices, wherein the power conversion circuit further includes a second plurality of switching devices, and wherein the method further comprises operating, in the first mode of operation, the second plurality of switching devices in synchronization with the first plurality of switching devices to convert the high-voltage DC power into the DC power.

16. The method of claim 15, wherein the uninterruptible power supply includes a boost converter, and wherein the method further comprises regulating, in the first mode of operation, a battery charging current of the uninterruptible power supply by operating the first plurality of switching devices and the second plurality of switching devices with a pulse width modulated signal having a duty cycle of 50%, and adjusting, in the first mode of operation, a switching frequency of the boost converter.

17. The method of claim 15, wherein the uninterruptible power supply includes a series resonant DC to DC converter, and wherein the method further comprises regulating, in the first mode of operation, a battery charging current of the uninterruptible power supply by operating the first plurality of switching devices and the second plurality of switching devices with a pulse width modulated signal having a duty cycle of less than 50%, and adjusting, in the first mode of operation, a resonance link current of the series resonant DC to DC converter by varying the duty cycle of the pulse width modulated signal.

18. The method of claim 13, wherein the uninterruptible power supply includes a series resonant DC to DC converter, wherein the power conversion circuit includes a plurality of switching devices, and wherein the method further comprises operating, in the second mode of operation, the plurality of switching devices with a pulse width modulated signal having a duty cycle of 50% and further having a frequency approximately equal to a resonance frequency of the series resonant DC to DC converter to convert the DC power into a high-voltage DC power.

19. A power converter, comprising:
    a power input configured to receive an input power from a power source;
    a power output configured to provide an output power to a load;
    a battery interface configured to exchange a battery power with a battery;
    a power converter circuit coupled to the power input, the power output, and the battery interface, the power converter circuit including a transformer, a plurality of selectively interconnectable electrical components, a first connection node disposed between at least two of the plurality of selectively interconnectable electrical components and switchably coupled to one of the power input and the transformer, and a second connection node disposed between at least two others of the plurality of selectively interconnectable electrical components and switchably coupled to one of the power input and the transformer; and
    means for selectively configuring an interconnection of the plurality of electrical components into one of a first interconnection configuration for converting the input power into the battery power and a second interconnection configuration for converting the battery power into the output power, the second interconnection configuration having a different interconnection of the plurality of electrical components than the first interconnection configuration.

20. The power converter of claim 19, wherein the plurality of electrical components, in the first interconnection configuration, includes a boost converter, and wherein the plurality of electrical components, in the second interconnection configuration, includes an inverter.

* * * * *

UNITED STATES PATENT AND TRADEMARK OFFICE
CERTIFICATE OF CORRECTION

| | | |
|---|---|---|
| PATENT NO. | : 8,698,354 B2 | Page 1 of 1 |
| APPLICATION NO. | : 12/940100 | |
| DATED | : April 15, 2014 | |
| INVENTOR(S) | : Ghosh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this
Eleventh Day of August, 2015

Michelle K. Lee
*Director of the United States Patent and Trademark Office*